Oct. 7, 1958 R. DUDLEY 2,854,855
CONTROL TIMER
Filed March 20, 1956 2 Sheets-Sheet 1

INVENTOR.
RANDOLPH DUDLEY
BY
Mason, Kolehmainen, Rathburn & Wyss
ATTORNEYS

Oct. 7, 1958

R. DUDLEY 2,854,855

CONTROL TIMER

Filed March 20, 1956

INVENTOR.
RANDOLPH DUDLEY
BY
Mason, Kolehmainen, Rathburn & Wyss
ATTORNEYS

United States Patent Office 2,854,855
Patented Oct. 7, 1958

2,854,855
CONTROL TIMER

Randolph Dudley, Peoria, Ill., assignor to Altofer Bros. Company, Peoria, Ill., a corporation of Illinois Application March 20, 1956, Serial No. 572,640

10 Claims. (Cl. 74—405)

The present invention relates to and has for its primary object the provision of a new and improved control timer.

The control timer of the present invention is intended primarily for use with domestic appliances of various sorts such as washing machines. Devices of this character are utilized to control the sequence of operations of the appliance. The device includes a drive motor which may be electrically energized and which drives a drive gear. It also includes a switch assembly including a rotatable cam shaft. The motor drives the cam shaft which in turn controls switches controlling various components of the machine to effect their operation in desired sequence.

In control timers of the character to which the present invention pertains, it is desired that the timer be manually operable to modify the duration or sequence of operations in accordance with the desires of an operator. For example, it may be desirable to shorten certain operations or to skip them entirely. For this purpose the timer is provided with a manually operable means operatively connected to the cam shaft. The present invention has for one of its objects the provision of a new and improved timer control including novel selectively engageable and disengageable drive means between the motor and the cam shaft whereby the latter is readily and effectively disengageable from the motor in order to facilitate manual movement of the cam shaft in order to modify or omit certain of the operations controlled by the switch.

A further object of the present invention is a provision of a new and improved control timer including selectively engageable and disengageable drive means between the driving motor and the cam shaft comprising a pivotally operable lever upon which are supported gear means adapted to be moved between selected positions in which the drive between the motor and cam shaft is selectively engaged and disengaged and in which pivotal movement of the gear supporting means is effected by longitudinal movement of the cam shaft.

A further object of the present invention is to provide a new and improved drive engaging means between the motor and cam shaft comprising a pivotally movable lever supporting a plurality of gears and in which spring means is utilized to bias the lever in order to effect disengagement of the gears and also resiliently to effect engagement of the gears, even when the gears may not be properly meshed, when it is desired to render the drive effective.

A further object of the present invention is the provision of a new and improved control timer in accordance with the preceding paragraph in which the gears are so arranged that when the drive is rendered effective, the driving relationship is such as to make the gears mesh rather than unmesh by virtue of the sliding relation between them.

Another object of the present invention is to provide a control timer with drive means comprising selectively engageable gears which are spring biased into engagement and provided with means limiting movement of the gears toward each other thereby to prevent jamming or undesirable crowding of the gears toward each other.

In brief, the control timer of the present invention comprises a drive motor and a drive gear or pinion driven by it. It comprises also switch means including a rotatable cam shaft upon which is mounted a driven gear. The cam shaft and driven gear are longitudinally movable in order to selectively effect engagement or disengagement of the drive and driven gears, which engagement and disengagement is provided by selectively engageable gear means interconnecting the drive and driven gears. This gear means may comprise a first gear meshed with the driven gear in both positions of the cam shaft and driven gear and a second gear continuously meshed with the first gear and adapted selectively to be engaged with or disengaged from the drive gear. The gear means comprising the first and second gears are supported upon a lever supported for pivotal and limited lateral movement about a pivot axis located between the axes of the drive and driven gears so as to enable the lever to be moved, together with the first and second gears, between a plurality of positions, in one of which the second gear is engaged with the drive gear and in the second of which the second gear is disengaged from the drive gear. The selective movement of the lever is effected by cam means located coaxially relative to and mounted upon the cam shaft for longitudinal movement with the shaft between a first and engaged position of the gears and a second and disengaged position of the gears. The cam means also constitutes a secondary pivot axis for the lever about which the lever can pivot by virtue of the permitted lateral movement of the lever with respect to its main pivot axis. The lever is provided with cam follower means, which may be a circular portion of the lever constituted by a hole in the lever through which the cam shaft extends. Spring means are connected to the lever between the main pivot axis and the cam follower means for biasing the lever for movement about the main pivot axis in a direction to effect disengagement of the second and drive gears upon movement of cam means to its second and disengaged position. The same biasing means is effective to move the lever about the secondary pivot axis in a direction to effect engagement of the second gear and drive gear upon movement of said cam means to its first and engaged position. The arrangement is such that a single spring is utilized to disengage the drive and resiliently to effect the driving engagement. The gears are so mounted also that when the driving engagement is effected the gears rotate in such a direction that they tend to crowd toward each other, thereby to make the drive more effective. Means are also provided to limit the crowding movement, thereby to prevent jamming of the drive.

Other objects and advantages of the present invention will become apparent from the ensuing description of an illustrative embodiment of the invention, in the course of which reference is had to the accompanying drawings, in which.

Figure 1:
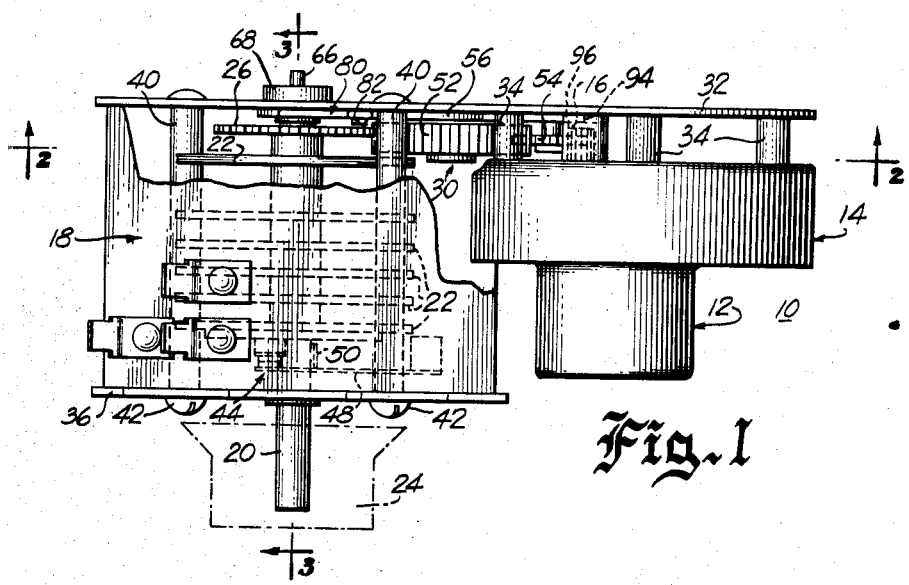
Fig. 1 is what may be considered a side elevational view of a control timer constructed in accordance with the present invention, the view being partly broken away in order better to illustrate the details thereof.

Referring now to the drawings, and first to Fig. 1, the control timer of the present invention is indicated as a whole by the reference character 10. It comprises, in the main, an electricaly energized motor 12 of known type with which is associated gearing 14 adapted either continuously or in step-by-step manner to drive a pinion or drive gear 16 at a slow speed. It includes also a switch assembly indicated as a whole by the reference character 18 comprising a rotatable cam shaft 20 upon which are mounted a series of cams 22 for operating the sequence switches 23 and at one end of which is located means 24 (such as the handle shown, or gearing, etc.) by means of which the shaft may be manually manipulated. At the other end of the cam shaft is mounted a gear 26, hereinafter called a driven gear, which is adapted selectively to be drivingly connected to the drive gear 16 through the novel drive and drive means of the present invention which is indicated generally by the reference character 30.

The motor and switch assembly are mounted upon a supporting plate 32. The motor is secured together with its gearing 14 to the support 32 by a plurality of mounting posts 34. The arrangement is such that the drive gear 16 is located between the gear housing 14 and the support plate 32.

Figure 3:
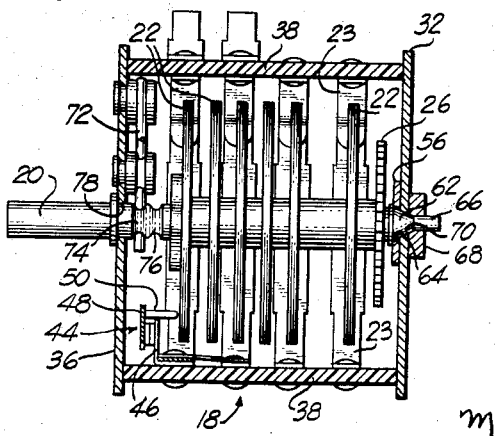
Fig. 3 is a cross sectional view axially through the switch assembly taken along the line 3—3 of Fig. 1.
Figure 8:
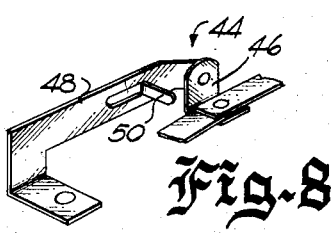
Fig. 8 is a perspective view of switch means forming part of the controller.

The switch assembly is constituted in part by the support plate 32 and by a front or upper support plate 36 spaced from the support plate 32 a sufficient distance to provide the space for the gears, the cams 22 and the associated switches 23 operated by the cam. The switches 23 are mounted upon axially extending and oppositely spaced support plates 38 made of insulating material and which are secured in place between the metallic plates 32 and 36 in known manner. The switch assembly includes also the spacing and supporting posts 40. One end of each post is fixedly secured to plate 32 and the plate 36 is secured to the opposite ends of the post by suitable means such as the screws 42, see Fig. 1. The switch assembly includes also a switch 44 operated by the axial movement of the cam shaft. As best shown in Figs. 3 and 8, it includes a stationary contact 46 and a movable contact arm 48 having an arm or projection 50 adapted to be engaged by the adjacent cam 22 when the switch is moved from the position of Fig. 3 to that of Fig. 5.

Figure 4:
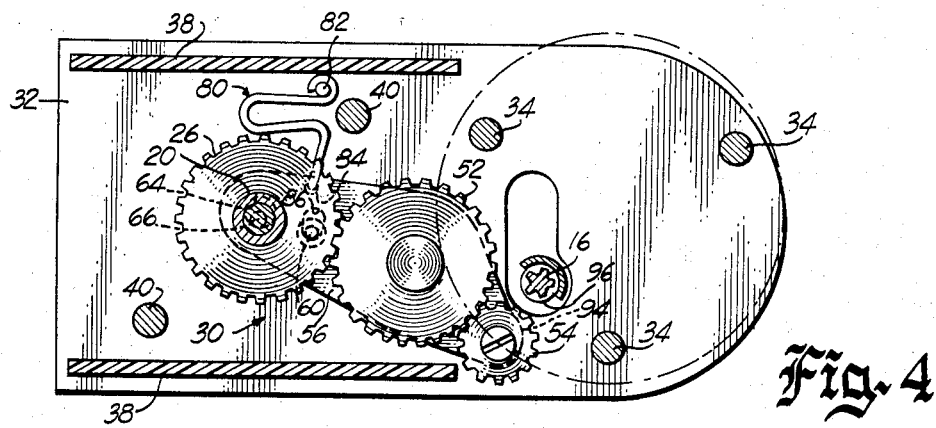
Fig. 4 is a view similar to Fig. 2 but illustrating the drive means between the motor and cam shaft disengaged.
Figure 5:
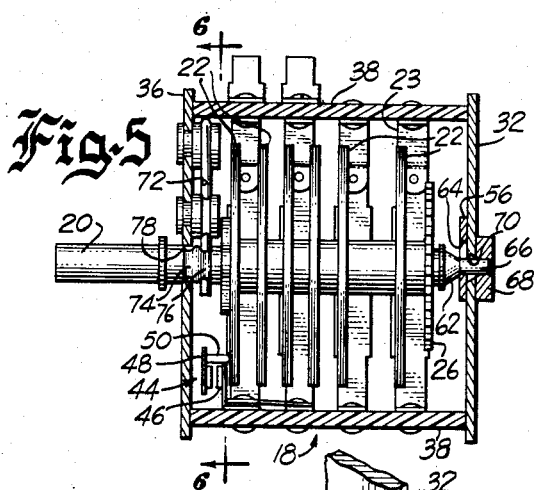
Fig. 5 is an axial cross sectional view of the switch assembly similar to that of Fig. 3 but illustrating the disengaged condition of the drive corresponding to Fig. 4.
Figure 6:
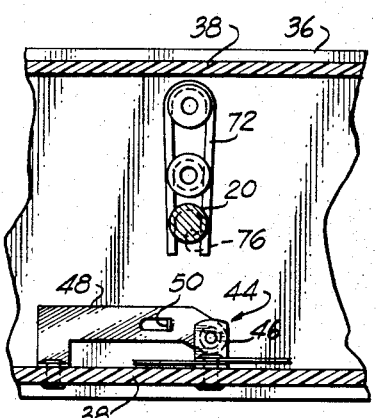
Fig. 6 is a fragmentary cross sectional view taken along the line 6—6 of Fig. 5.

As earlier indicated, the present invention relates to the coupling and driving means between the motor and cam shaft and more particularly to the selectively engageable and disengageable drive means 30 located between the drive gear 16 driven by the motor and the driven gear 26 mounted upon the cam shaft 20. In accordance with the present invention, the drive means is constructed and arranged to be controlled in response to axial movement of the cam shaft 20. In one position the drive is engaged and in a second position the drive is disengaged. The engaged position is illustrated in Figs. 1, 2 and 3 and the disengaged position is illustrated in Figs. 4 and 5.

Figure 7:
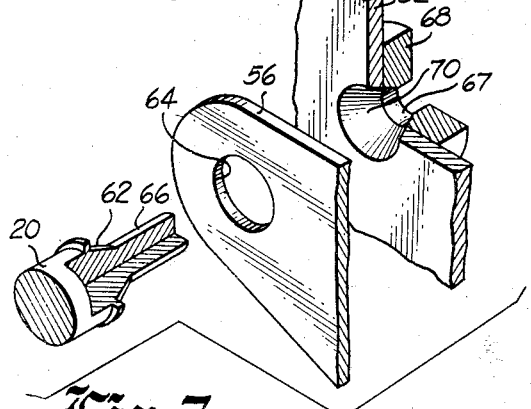
Fig. 7 is a fragmentary enlarged exploded view illustrating details of a cam associated with the cam shaft utilized to control the driving engagement between the motor and cam shaft.

The drive gear 16 and driven gear 26 are adapted selectively to be interconnected by gear means comprising a first gear 52 adapted continuously to be meshed with the driven gear 26 and a second gear 54 continuously meshed with the gear 52 but adapted selectively to be engaged with or disengaged from the drive gear 16. The gear means 52 and 54 are rotatably mounted upon a movably mounted lever 56 which is somewhat triangular in configuration and which, as will be described shortly, is movable about the spaced apart pivot axes, the first and main one of which is constituted by a pin 60 and the second of which is constituted by a generally conical surface 62 formed near one end of the cam shaft 20 for cooperation with the lever 56 which is provided with a circular opening 64 at a point substantially coaxial with the shaft 20, as best illustrated in Figs. 3, 5 and 7. The conical cam surface terminates in a reduced diameter cylindrical portion 66 rotatably and slidably received in an aperture 67 in a supporting block or boss 68 secured to the backside of plate 32. The boss and opening in the side plate 32 are bored or otherwise provided with a conical recess 70, see Fig. 7, adapted in one position of the shaft and cam means 62 to receive the cam means, see Fig. 3.

Figure 2:
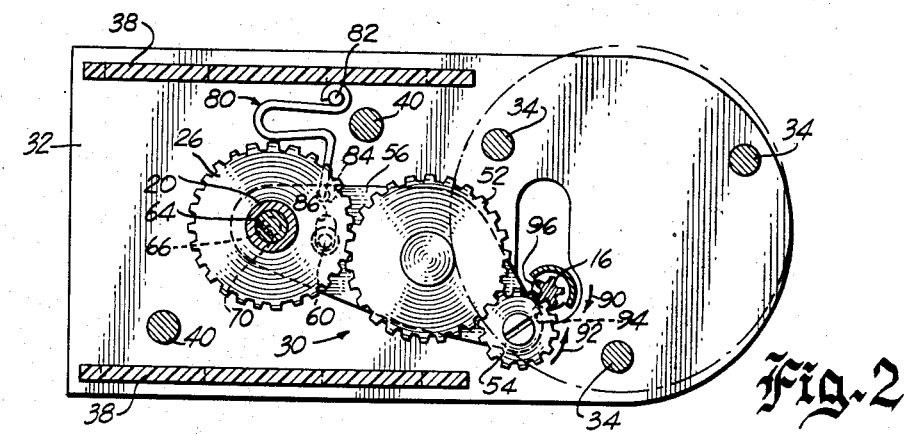
Fig. 2 is a transverse cross sectional view taken along the line 2—2 of Fig. 1 and showing the drive means engaged drivingly to connect the motor and cam shaft.

To effect engagement of the drive means, the cam shaft 20 is moved inwardly, i. e., to the position in which it is illustrated in Figs. 1, 2 and 3. It is retained in this position by suitable detent means comprising a hair spring 72 and groove 74 comprising one of a pair of axially spaced apart annular grooves 74 and 76 on the shaft. Groove 76 determines the disengaged position. The front end of shaft 20 is slidably and rotatably received in opening 78 in plate 36.

Further in accordance with the present invention, the drive means is resiliently held in its engaged position. This resilient holding is provided by a spring indicated generally by the reference character 80, which spring is also utilized to effect disengagement of the drive upon movement of the cam shaft from the position of Fig. 3 to the position of Fig. 5 in order to enable the use of a single spring for both purposes.

In the engaged position of the drive means, the spring 80 biases the gear 54 toward and into engagement with the drive gear 16. The spring, which is preferably of the hairpin type, has one end fixed to a pin 82 secured to the back plate 32 and the other end is secured to the lever 56 as through an aperture 84 in the lever. The connection to the lever is at a point between the ends of the lever and at a region such that in the engaged position illustrated in Fig. 2 the lever is resiliently biased about a pivot constituted by the conical end surface 62 on the cam shaft. In other words, the lever is biased to move in a counterclockwise direction around shaft 20, as viewed in Fig. 2. In order to enable the lever to be biased in this manner, the lever is provided with a somewhat enlarged opening 86 through which the main or first pivot defining pin 60 extends. The construction is thus such that the driving connection between the drive gear 16 and the gear 54 is resiliently effected by the spring 80.

The disengagement of the drive means is effected also by the spring 80 upon movement of the cam shaft 20 from the position of Figs. 1, 2 and 3 to the position of Figs. 4 and 5. When thus retracted, the conical cam surface 62 is removed from the aperture 64 in the lever with the result that the spring 80 causes the lever to pivot in a clockwise direction about the pin 60 thereby to move the lever from the position of Fig. 2 to the position of Fig. 4. The enlarged opening 86 in the lever is such that the lever can readily be pivoted from the position of Fig. 2 to that of Fig. 4 but yet large enough so that there is some freedom of movement of the lever about the pivot constituted by cam surface 62 when the lever is pushed inwardly from the position of Fig. 5 to that of Fig. 4.

In accordance with a further feature of the present invention, the gear 54 is so located relative to the drive gear 16 that when driving engagement is effected the rotational forces tend to crowd the gears together. This additionally insures effective coupling. Upon reference to Fig. 2 it will be seen that the directions of gear rotation have been indicated, that of gear 16 by the reference character 90 and that of gear 54 by the arrow 92. These directions are such that the gear 54 tends to be crowded between the gears 16 and 52.

In order to prevent overcrowding or jamming of the gears 16 and 54 when they are engaged, means are provided to limit movement of them toward each other. As illustrated, this means includes a portion 94 of the lever 56 and a circular portion 96 of the gearing structure 14 and generally coaxially located relative to drive gear 16.

In operation, the motor 12 drives the drive gear 16 either continuously or intermittently or by step-by-step fashion through the gearing 14. The drive gear 16 is meshed with the gear 54 in such manner that the latter is crowded toward the gear 52. The gears 52 and 54 are continuously meshed as is the gear 52 with the gear 26. The gear 52 is, likewise, of considerable width as compared with the gear 26 which is movable axially of the gear 52 whereby these two gears are continually meshed irrespective of the axial position of the cam shaft 20. The gears 52 and 54 are mounted on the lever 56, which is biased in a counterclockwise direction, in the engaged condition of the gears, about a pivot defined by the conical end surface 62 at the inner end of cam shaft 20. The arrangement is thus such that the gear 26 is rotated either continuously or in step-by-step manner to effect corresponding rotation of the cam shaft 20 and the cam 22 mounted thereon. The cam 22 rotates and selectively operates various of the switches 23 to effect the desired sequential operation of the apparatus controlled by the time switch. The cam shaft 20 is maintained in its inward or clutch engaged position by the detent mechanism comprising the hair spring 72, which, in the engaged position, is in the annular groove 74.

When it is desired to disengage the drive means and to move the cam shaft to modify the control operations either by shortening some period or omitting a period or periods, the cam shaft 20 is pulled outwardly thereby to disconnect the cam shaft from the motor. This makes it easy to move the cam shaft particularly in the event the motor and gearing have no fricture cluth or the like enabling the cam shaft to be rotated independently of the motor. Also, the present invention, which effectively and entirely disconnects the cam shaft from the motor makes it possible more readily to turn the cam shaft. The retracted or disengaged position of the cam shaft is indicated in Fig. 5 in which the detent spring 72 is in the detent groove 76.

When the cam shaft is moved from the position of Fig. 3 to that of Fig. 5, the cam surface 62 is moved out of the aperture 64 in the lever 56. When so withdrawn, the spring 80 moves the lever 56 in a clockwise direction about the pivot pin 60 by reason of the fact that the spring 84 is connected to the lever to the left of a line between the centers of pins 60 and 82, i. e., the pivot pin for the lever and the fixed end of the spring. This movement of the lever effects disengagement of the gear 54 from the drive gear 60. Gear 26 remains meshed with the gear 30.

When it is desired to effect engagement of the drive, the shaft 20 is pushed inwardly. As a result, the cam surface 62 enters the opening 64 and engages the lever thereat to move the lever about a pivot defined by the surface 62 whereby the lever is moved in a counterclockwise direction from the disengaged position of Fig. 4 to the engaged position of Fig. 2. The opening 86 in the lever 56 through which the pivot pin 60 extends permits the resilient biasing of the lever 56 toward the engaged position. As a result, no harm is done to the apparatus in the event the teeth of gears 54 and 16 should be opposed at the instant of engagement of the drive means.

The arrangement of the gears is such that the gears tend to crowd themselves into mesh but engagement between portion 96 of gearing structure 34 and the bushing 94 prevents jamming or over-crowding of the gears.

While the present invention has been described in connection with the details of an illustrative embodiment thereof, it should be understood that these details are not intended to be limitative of the invention except insofar as set forth in the accompanying claims.

Having thus described my invention, what is desired to be secured by Letters Patent of the United States is:

1. A timer control comprising a drive motor, a drive gear driven thereby, a rotatable cam shaft, a driven gear connected to the cam shaft for driving it, said cam shaft being longitudinally movable, gear means adapted to interconnect said drive and driven gears, support means pivotally mounting said gear means for movement between a plurality of positions in one of which said gear means drivingly interconnects said drive and driven gears, and means operable by longitudinal movement of said shaft in opposite directions for effecting pivotal movement of said support means between said positions.

2. A timer control comprising a drive motor, a drive gear driven thereby, a rotatable cam shaft, a driven gear mounted upon the cam shaft for driving it, said cam shaft and driven gear being longitudinally movable, gear means adapted to interconnect said drive and driven gears comprising a first gear meshed with said driven gear in both positions of the driven gear and a second gear continuously meshed with said first gear, support means pivotally mounting said first and second gears for movement between a plurality of positions in one of which said second gear is engaged with said drive gear and in a second of which said second gear is disengaged from said drive gear, and means operable by longitudinal movement of said shaft in opposite directions for effecting pivotal movement of said support means between said positions to effect selective engagement and disengagement of said second gear with said drive gear.

3. A control timer comprising a drive motor, a drive gear driven thereby, a rotatable cam shaft, a driven gear mounted upon the cam shaft for driving it, said cam shaft and driven gear being longitudinally movable, gear means adapted to interconnect said drive and driven gears comprising a first gear meshed with said driven gear in both positions of the driven gear and a second gear continuously meshed with said first gear, a lever supporting said first and second gears, means supporting said lever for pivotal and limited lateral movement about a first pivot axis located between the axes of said drive and driven gears to effect movement of said lever and said first and second gears between a plurality of positions in a first of which said second gear is engaged with said drive gear and in a second of which said second gear is disengaged from said drive gear, cam means coaxial, relative to and mounted upon the cam shaft axis for longitudinal movement with said shaft between a first and engaged position and a second and disengaged position and constituting a second pivot axis for the lever about which the lever can pivot by virtue of the lateral movement of the lever with respect to its first pivot axis, cam follower means on said lever cooperating with said cam means, and spring means connected to said lever between said first pivot axis and cam follower means for biasing said lever for movement about said first pivot axis in a direction to effect disengagement of said second and drive gears upon movement of said cam means to its second and disengaged position and for movement about said second pivot axis in a direction to effect engagement of said second gear and drive gear upon movement of said cam means to its first and engaged position.

4. A control timer comprising a drive motor, a drive gear driven thereby, a rotatable cam shaft, a driven gear connected to the cam shaft for driving it, said cam shaft being longitudinally movable, gear means adapted to interconnect said drive and driven gears, support means mounting said gear means for movement between a plurality of positions in one of which said gear means drivingly interconnects said drive and driven gears, means defining first and second pivot axes for said support means, and means operable by longitudinal movement of said shaft in opposite directions for effecting movement of said support means about the first axis in one direction and the second axis in the opposite direction between said positions.

5. A control timer comprising a drive motor, a drive gear driven thereby, a rotatable cam shaft, a driven gear connected to the cam shaft for driving it, said cam shaft being longitudinally movable, gear means adapted to interconnect said drive and driven gears, support means pivotally movable about spaced axes and mounting said gear means for movement between a plurality of positions in one of which said gear means drivingly interconnects said drive and driven gears, means operable by longitudinal movement of said shaft in opposite directions for effecting pivotal movement of said support means about said axes to effect movement thereof between said positions, and spring means biasing said supporting means toward both said positions.

6. A control timer comprising a drive motor, a drive gear driven thereby, a rotatable cam shaft, a driven gear connected to the cam shaft for driving it, said cam shaft being longitudinally movable, gear means adapted to interconnect said drive and driven gears, support means pivotally movable about spaced axes and mounting said gear means for movement between a plurality of positions in one of which said gear means drivingly interconnects said drive and driven gears, means operable by longitudinal movement of said shaft in opposite directions for effecting pivotal movement of said support means about said axes to effect movement thereof between said positions, and single spring means biasing said supporting means for movement about one of said axes toward one of said positions and about the other of said axes toward the other of said positions.

7. A control timer comprising a drive motor, a drive gear driven thereby, a rotatable cam shaft, a driven gear connected to the cam shaft for driving it, said cam shaft being longitudinally movable, gear means adapted to interconnect said drive and driven gears, support means pivotally mounting said gear means for movement between a plurality of positions in one of which said gear means drivingly interconnects said drive and driven gears, said gear means being arranged so that the interconnected gears tend to crowd toward each other better to mesh each other, and means operable by longitudinal movement of said shaft in opposite directions for effecting pivotal movement of said support means between said positions.

8. A timer control comprising a drive motor having a rotatable output element, a longitudinally movable cam shaft rotatable about an axis which is parallel to and substantially displaced from the axis of rotation of said output element, drive means adapted selectively to interconnect said output element and said cam shaft, support means mounting said drive means for movement transversely of the axis of rotation of said cam shaft between a plurality of positions in one of which said drive means interconnects said output element and said cam shaft, and means operable by longitudinal movement of said cam shaft in opposite directions for effecting movement of said drive means between said positions.

9. A timer control as set forth in claim 8 wherein said drive means is pivotally mounted for movement in a plane perpendicular to the principal axis of said cam shaft.

10. A timer control comprising a drive motor having a rotatable output element, a longitudinally movable cam shaft rotatable about an axis which is parallel to and substantially displaced from the axis of rotation of said output element, drive means adapted selectively to interconnect said output element and said cam shaft, support means mounting said drive means for movement transversely of the axis of rotation of said cam shaft between a plurality of positions in one of which said drive means interconnects said output element and said cam shaft, and means operable by longitudinal movement of said cam shaft in opposite directions for effecting movement of said drive means between said positions, said last-named means comprising a cam surface on said cam shaft.

References Cited in the file of this patent

UNITED STATES PATENTS

| | | |
|---|---|---|
| 1,635,192 | Preimesberger | July 12, 1927 |
| 2,151,150 | Pohlmeyer | Mar. 21, 1939 |
| 2,191,332 | Wardwell | Feb. 20, 1940 |
| 2,411,618 | Elliott | Nov. 26, 1946 |
| 2,435,122 | Berndt | Jan. 27, 1948 |
| 2,525,915 | Kuhn | Oct. 17, 1950 |
| 2,541,360 | Hall | Feb. 13, 1951 |
| 2,803,121 | Ferraguti | Aug. 20, 1957 |